(12) United States Patent
Kimura

(10) Patent No.: US 6,567,925 B1
(45) Date of Patent: May 20, 2003

(54) IMAGE SIGNAL PROCESSING METHOD AND IMAGE SIGNAL PROCESSOR

(75) Inventor: Keishi Kimura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 526 days.

(21) Appl. No.: 09/580,834

(22) Filed: May 30, 2000

(30) Foreign Application Priority Data

Jun. 2, 1999 (JP) .......................................... 11-155229

(51) Int. Cl.$^7$ .............................. G06F 1/04; G06F 1/14
(52) U.S. Cl. ...................................... 713/502; 713/400
(58) Field of Search ................................. 713/400, 500, 713/502, 503

(56) References Cited

U.S. PATENT DOCUMENTS

| 4,912,549 A | * | 3/1990 | Altman et al. ............... 348/496 |
| 5,576,760 A | * | 11/1996 | Akiyama .................. 348/231.99 |
| 6,067,411 A | * | 5/2000 | Poimboeuf et al. ........... 713/400 |
| 6,456,329 B1 | * | 9/2002 | Tinker et al. ................ 348/448 |

* cited by examiner

Primary Examiner—Dennis M. Butler
(74) Attorney, Agent, or Firm—Oliff & Berridge, PLC (57) ABSTRACT

Image signals of a progressive scan image are formed by arranging the image signals in each field in a normal order, even when the image signals in an interlace system are input, while a phase difference between a vertical synchronization signal and a horizontal synchronization signal is not constant. A switch sequentially selects a field memory in a field memory unit every time a vertical synchronization signal Vsync is input. In the selected field memory, a timer value of a timer, which is from an input of the vertical synchronization signal to an input of each horizontal synchronization signal, is written together with an image signal subsequent to each horizontal scanning signal. A sort processing unit reads image signals from two field memories in which the timer values and the image signals were recently written, arranges the image signals in order of the timer values corresponding to the image signals, and writes the image signals in a frame memory.

6 Claims, 8 Drawing Sheets

| TA1 | LINE A1 DATA |
|---|---|
| TA2 | LINE A2 DATA |
| TA3 | LINE A3 DATA |
| TA4 | LINE A4 DATA |
| TA5 | LINE A5 DATA |
| TA6 | LINE A6 DATA |
| ⋮ | ⋮ |
| TAn | LINE An DATA |

| TB1 | LINE B1 DATA |
|---|---|
| TB2 | LINE B2 DATA |
| TB3 | LINE B3 DATA |
| TB4 | LINE B4 DATA |
| TB5 | LINE B5 DATA |
| TB6 | LINE B6 DATA |
| ⋮ | ⋮ |
| TBn | LINE Bn DATA |

SORT IN ORDER OF TIMER VALUES

| TA1 | LINE A1 DATA |
|---|---|
| TB1 | LINE B1 DATA |
| TA2 | LINE A2 DATA |
| TB2 | LINE B2 DATA |
| TA3 | LINE A3 DATA |
| TB3 | LINE B3 DATA |
| TA4 | LINE A4 DATA |
| TB4 | LINE B4 DATA |
| TA5 | LINE A5 DATA |
| TB5 | LINE B5 DATA |
| TA6 | LINE A6 DATA |
| TB6 | LINE B6 DATA |
| ⋮ | ⋮ |
| ⋮ | ⋮ |
| TAn | LINE An DATA |
| TBn | LINE Bn DATA |

FIG. 1

| TA1 | LINE A1 DATA |
|---|---|
| TA2 | LINE A2 DATA |
| TA3 | LINE A3 DATA |
| TA4 | LINE A4 DATA |
| TA5 | LINE A5 DATA |
| TA6 | LINE A6 DATA |
| ⋮ | ⋮ |
| TAn | LINE An DATA |

FIG. 3(a)

| TB1 | LINE B1 DATA |
|---|---|
| TB2 | LINE B2 DATA |
| TB3 | LINE B3 DATA |
| TB4 | LINE B4 DATA |
| TB5 | LINE B5 DATA |
| TB6 | LINE B6 DATA |
| ⋮ | ⋮ |
| TBn | LINE Bn DATA |

FIG. 3(b)

SORT IN ORDER OF TIMER VALUES

| TA1 | LINE A1 DATA |
|---|---|
| TB1 | LINE B1 DATA |
| TA2 | LINE A2 DATA |
| TB2 | LINE B2 DATA |
| TA3 | LINE A3 DATA |
| TB3 | LINE B3 DATA |
| TA4 | LINE A4 DATA |
| TB4 | LINE B4 DATA |
| TA5 | LINE A5 DATA |
| TB5 | LINE B5 DATA |
| TA6 | LINE A6 DATA |
| TB6 | LINE B6 DATA |
| ⋮ | ⋮ |
| TAn | LINE An DATA |
| TBn | LINE Bn DATA |

FIG. 3(c)

FIG. 4(a) Vsync

FIG. 4(b) FIRST FIELD MEMORY

FIG. 4(c) SECOND FIELD MEMORY

FIG. 4(d) THIRD FIELD MEMORY

FIG. 4(e) SORT PROCESSING

IMAGE SIGNAL PROCESSING METHOD AND IMAGE SIGNAL PROCESSOR

BACKGROUND OF THE INVENTION

1. Field of Invention

The present invention relates to image signal processors and image signal processing methods for converting image signals in an interlace system into image signals in a progressive scan system.

2. Description of Related Art

Various types of image display devices, such as a liquid crystal projector, for receiving image signals supplied from electronic devices, e.g., a personal computer; and for displaying images are proposed. Concerning transmission systems for transmitting image signals handled by these image display devices, there are a progressive scan system and an interlace system. In the progressive scan system, image signals corresponding to all horizontal scanning lines constructing a single screen in a single frame are transmitted in order. In contrast, in the interlace system, a single frame is divided into two fields. In a first field (odd field), every other horizontal scanning line constructing a single screen is selected and image signals corresponding to the selected horizontal scanning lines are transmitted. In a subsequent field (even field), image signals corresponding to the remaining horizontal scanning lines are transmitted.

Of the image display devices including the liquid crystal projector, there is a type for converting, when image signals in the interlace system are supplied, the image signals into image signals in the progressive scan system, writing the image signals in a frame memory, and displaying the image signals.

Figure 8:
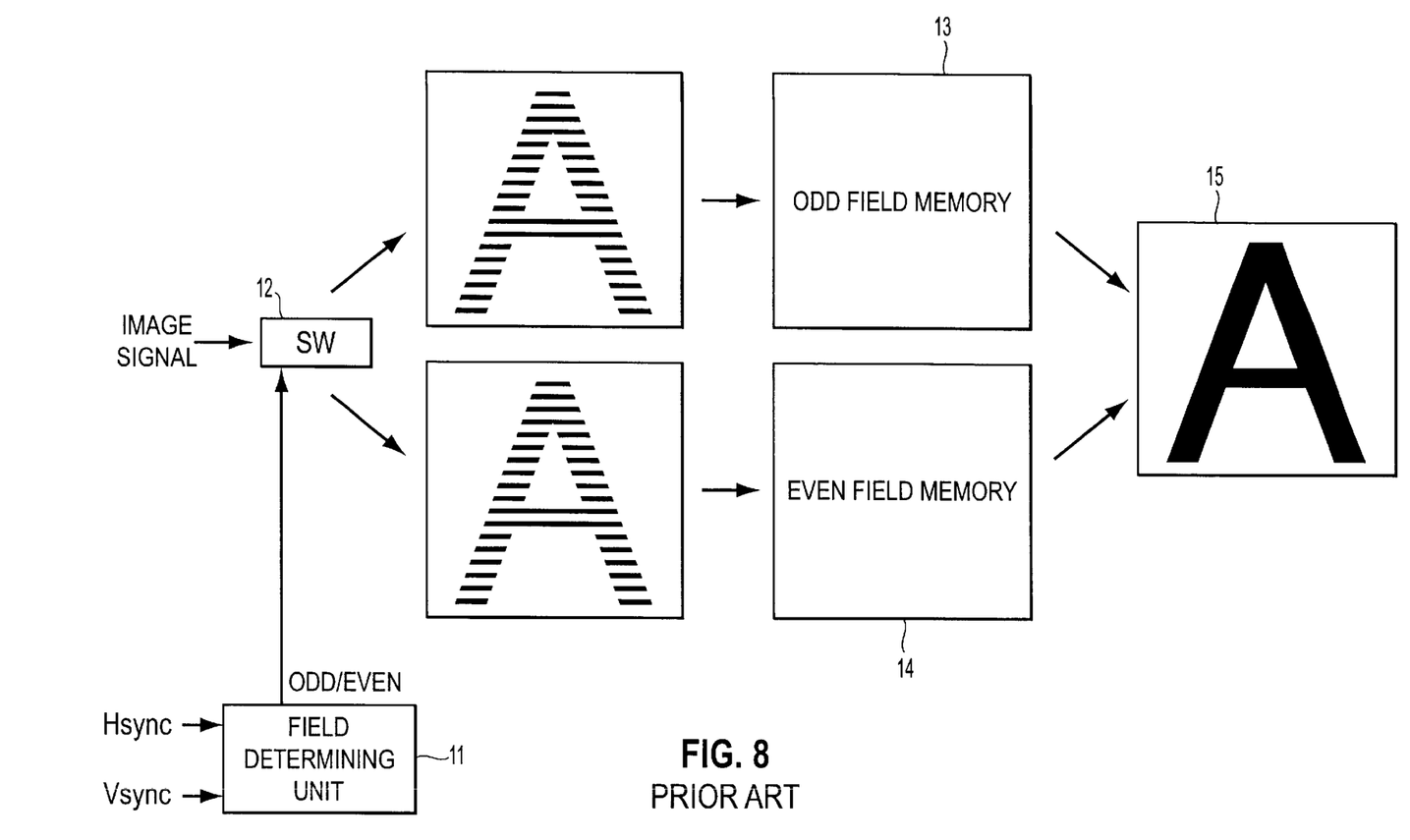
FIG. 8 is a block diagram of the structure of a conventional image signal processor.

Hitherto, an image signal processor with a structure shown in FIG. 8 has been used to perform conversion in such an image display device.

In FIG. 8, a field determining unit II determines whether a phase difference between a vertical synchronization signal Vsync and a horizontal synchronization signal Hsync input subsequent to the vertical synchronization signal Vsync is within a predetermined value, thus determining that the field starting with the vertical synchronization signal Vsync is an odd field or an even field. An image signal input in the odd field is written in an odd field memory 13 via a switch 12. An image signal input in the even field is written in an even field memory 14 via the switch 12. The image signals corresponding to the horizontal scanning lines are alternately read from the odd field memory 13 and the even field memory 14, and are sequentially written in a frame memory 15. As a result, the image signals of a progressive scan image on a single screen are obtained in the frame memory 15.

SUMMARY OF THE INVENTION

In recent personal computers or the like, the number of horizontal scanning lines and the pixel density can be arbitrarily set, and the personal computer and the image display device may be connected by various transmission media. Therefore, it is not ensured that the vertical synchronization signal Vsync and the horizontal synchronization signal Hsync output from the personal computer are transmitted to the image display device while maintaining the phase difference. Under these circumstances, the phase difference between the vertical synchronization signal Vsync and the horizontal synchronization signal Hsync output from the personal computer is not constant. If the odd-even determination is performed based on the phase difference between the above vertical synchronization signal Vsync and the horizontal synchronization signal Hsync, the determination may be incorrect, and a normal progressive scan image cannot be obtained.

In view of the above-described circumstances, it is an object of the present invention to provide an image signal processor and an image signal processing method for arranging image signals in fields in a normal order and thereby constructing image signals of a progressive scan image, even when image signals in an interlace system are input, while a phase difference between a vertical synchronization signal and a horizontal synchronization signal is not constant.

An image signal processing method or an image signal processor according to a first invention associatively stores elapsed times from the input of a vertical synchronization signal to the input of horizontal synchronization signals and image signals subsequent to the horizontal synchronization signals in a storage device, and forms image signals of a progressive scan image by arranging the image signals stored in the storage device within two successive vertical scanning periods in an order of the elapsed times corresponding to the image signals.

Therefore, it is possible to obtain the image signals of the progressive scan image by arranging the image signals corresponding to horizontal scanning lines in display order even when a phase difference between the vertical synchronization signal and the horizontal synchronization signal is not constant.

According to a second invention, elapsed times from the input of a vertical synchronization signal to the input of horizontal synchronization signals and image signals subsequent to the horizontal synchronization signals are stored in a storage device. Based on the elapsed times stored in the storage device within two successive vertical scanning periods, an order of reading image signals within the vertical scanning periods from the storage device is determined. The image signals corresponding to horizontal scanning lines within the vertical scanning periods are alternately read from the storage device in that order, thus forming image signals of a progressive scan image.

In this case, it is not necessary to sort all image signals in accordance with timer values. This reduces arithmetic processing and increases the processing speed.

According to the above first or second invention, if a difference between the elapsed times within the two successive vertical scanning periods is within a predetermined range, the input image signals corresponding to the horizontal scanning lines can be output in the order as they are input.

Accordingly, it is possible to perform processing when image signals not only in an interlace system but also in a progressive scan system are input.

In each invention, the storage device is not necessarily a single memory. As long as the elapsed times and the image signals are associatively stored, the two can be stored in separate memories. In this case, the memory storing the elapsed times and the memory storing the image signals form the "storage device" in the present invention.

DETAILED DESCRIPTION OF PREFERRED EMBODIMENTS

The present invention is described hereinafter through the embodiments with the accompanying drawings.
(Embodiment 1)

Figure 1:
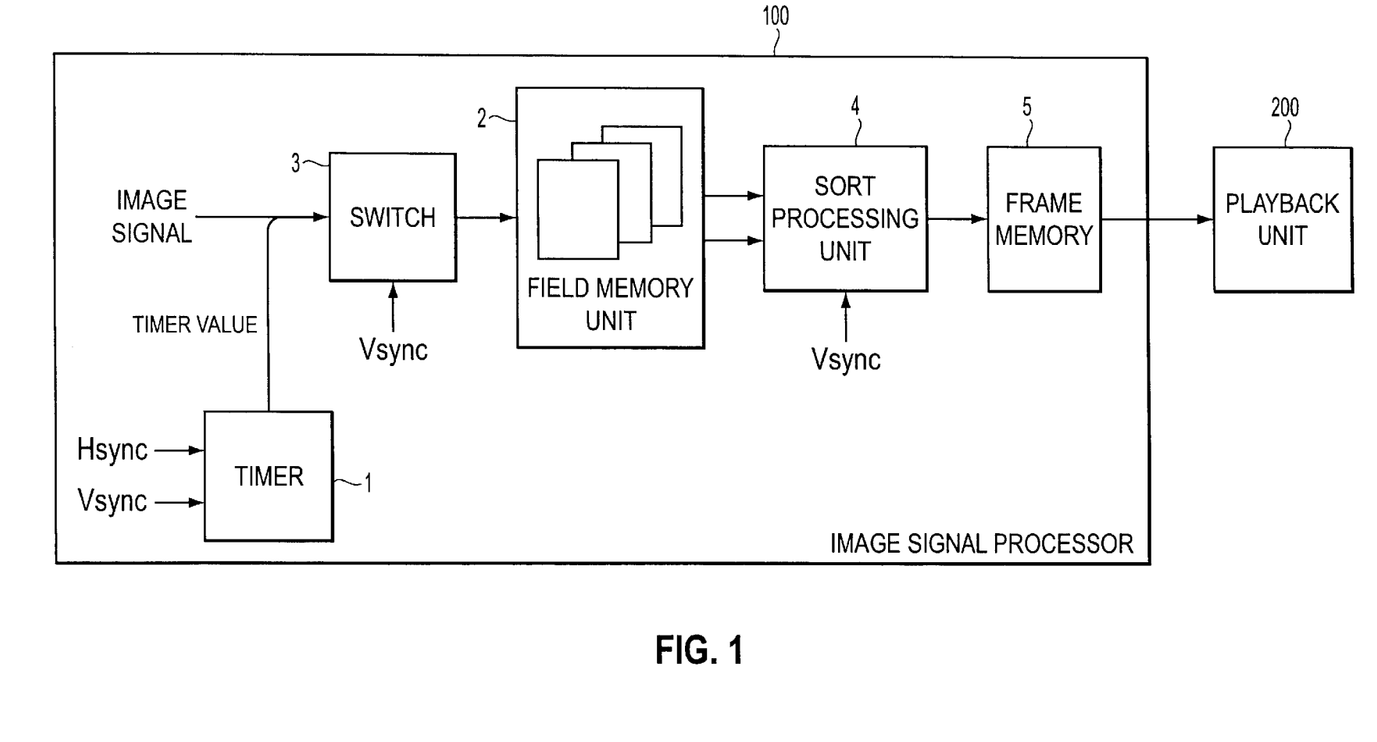
FIG. 1 is a block diagram of the structure of an image signal processor according to a first embodiment of the present invention.

FIG. 1 is a block diagram of the structure of an image signal processor 100 according to a first embodiment of the present invention. The image signal processor 100 may be included in an image display device, such as a liquid crystal projector. The image signal processor 100 receives an image signal, a vertical synchronization signal Vsync, and a horizontal synchronization signal Hsync from an external electronic device, such as a personal computer, and supplies the image signal in image units to a playback unit 200, such as a liquid crystal panel.

In FIG. 1, a timer 1 resets the timer value to "0" every time the vertical synchronization signal Vsync is input and starts timing. Subsequently, every time the horizontal synchronization signal Hsync is input, the timer 1 outputs the timer value at that time.

A field memory unit 2 includes a plurality of field memories. These field memories may be formed by independent RAMs. Alternatively, a single RAM may be divided into a plurality of areas, and each area may be assigned to one field memory.

A switch 3 sequentially selects one field memory in the field memory unit 2 every time the vertical synchronization signal Vsync is input. The switch 3 supplies the selected field memory with the timer value of the timer 1 corresponding to each horizontal synchronization signal Hsync in the field starting with the vertical synchronization signal Vsync and the image signal input subsequent to each horizontal synchronization signal Hsync. The destination, that is the field memory, associates and stores the timer value and the image signal.

Every time the vertical synchronization signal Vsync is input, a sort processing unit 4 selects two field memories in which the timer values and the image signals were recently written from among the field memories in the field memory unit 2, arranges the image data from the selected field memories in the order of timer values corresponding to the image data, and writes the image data as image signals of a progressive scan (non-interlace) image in a frame memory 5.

The image signals of the progressive scan image written in the frame memory 5 are supplied to the playback unit 200 including the liquid crystal panel, and are displayed on a screen of the playback unit 200.

The operation of the first embodiment is described using a specific example.

Figure 2A:
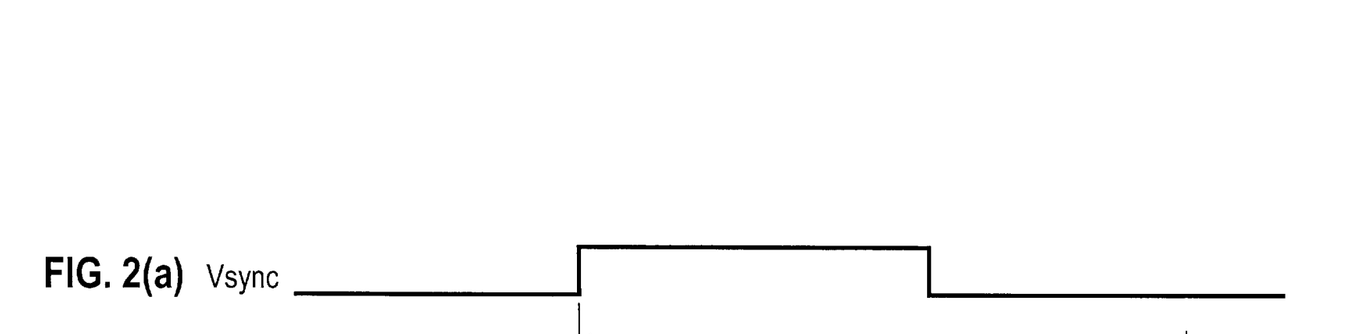
FIGS. 2(a)–(c) include timing charts illustrating waveforms of a vertical synchronization signal Vsync and a horizontal synchronization signal Hsync input to the above image signal processor.
Figure 2B:
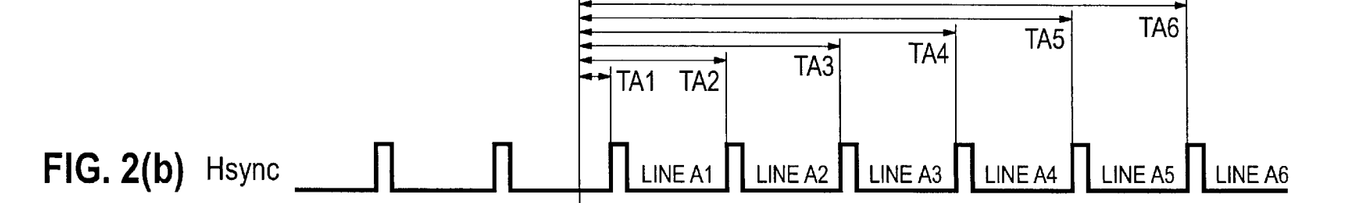
Figure 2C:
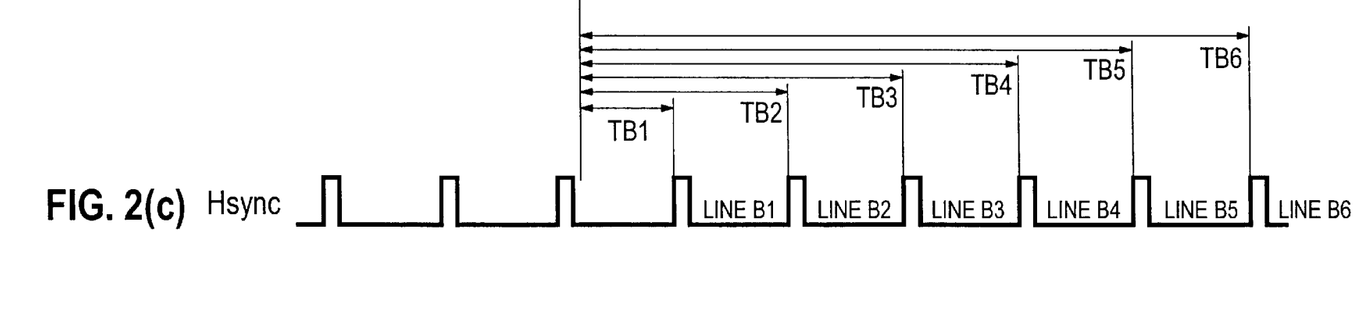

FIGS. 2(a) to (c) are timing charts illustrating the vertical synchronization signal Vsync and the horizontal synchronization signal Hsync of the image signal in the interlace system input to the image signal processor 100. More specifically, FIG. 2(a) illustrates the vertical synchronization signal Vsync. In order to prevent the drawing from becoming complicated, vertical synchronization signals Vsync corresponding to a series of fields are overlapped in the drawing. FIG. 2(b) illustrates a waveform of the horizontal synchronization signal Hsync in a certain field. FIG. 2(c) illustrates a waveform of the horizontal synchronization signal Hsync in a subsequent field.

When the vertical synchronization signal Vsync is input, the timer 1 in FIG. 1 resets the timer value and starts timing. For example, every time the horizontal synchronization signal Hsync shown in FIG. 2(b) is input, the timer 1 outputs the timer values TA1, TA2, . . . at that time. When the subsequent vertical synchronization signal Vsync is input, the timer 1 again resets the timer value and starts timing. Every time the horizontal synchronization signal Hsync shown in FIG. 2(c) is input, the timer 1 outputs the timer values TB1, TB2, . . . at that time. The timer 1 repeats the above processing.

Figure 3A:
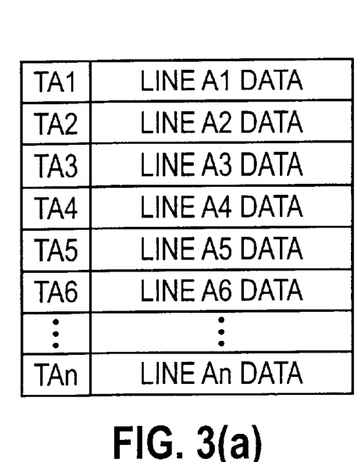
FIGS. 3(a)–(c) include illustrations describing processing contents of a sort processing unit 4 in the above embodiment.
Figure 3B:
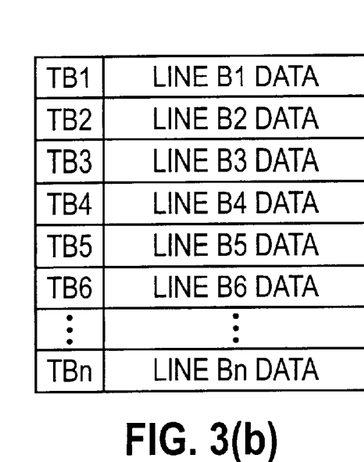

In contrast, when the vertical synchronization signal Vsync (FIG. 2(a)) is input, the switch 3 in FIG. 1 selects, for example, a first field memory in the field memory unit 2 from a single field starting with this vertical synchronization signal Vsync. As a result, the timer values TA1, TA2, . . . at the time the horizontal synchronization signal Hsync in FIG. 2(b) subsequent to the vertical synchronization signal Vsync is input, and the image signals corresponding to the horizontal scanning lines Line A1, Line A2, . . . are supplied via the switch 3 to the first field memory. As shown in FIG. 3(a), the timer values and the image signals corresponding to the horizontal synchronization lines are associated and stored. Subsequently, when a new vertical synchronization signal Vsync (FIG. 2(a)) is input, the switch 3 selects, for example, a second field memory in the field memory unit 2. As a result, from a new field starting with this vertical synchronization signal Vsync, timer values TB1, TB2, . . . at the time the horizontal synchronization signal Hsync in FIG. 2(c) subsequent to the vertical synchronization signal Vsync is input and the image signals corresponding to horizontal scanning lines Line B1, Line B2 . . . are supplied via the switch 3 to the second field memory. The image signals are thus stored as illustrated in FIG. 3(b).

Figure 3C:
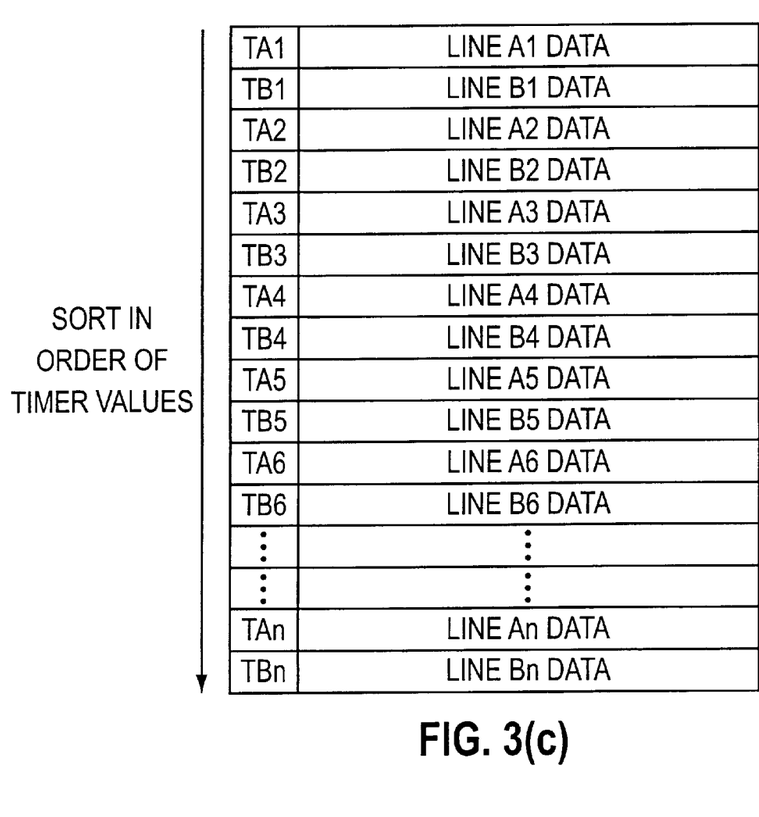
Figure 4A:
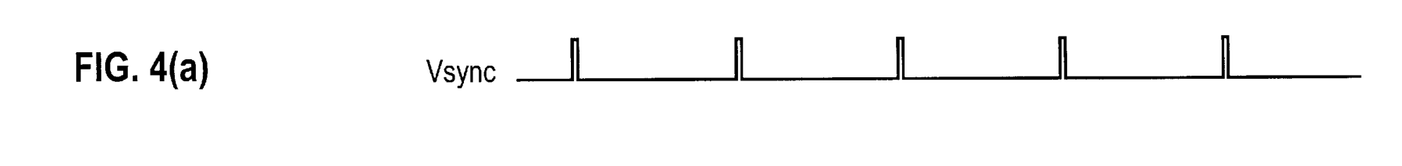
FIGS. 4(a)–(e) include timing charts describing the operation of the sort processing unit 4 in the above embodiment.
Figure 4B:
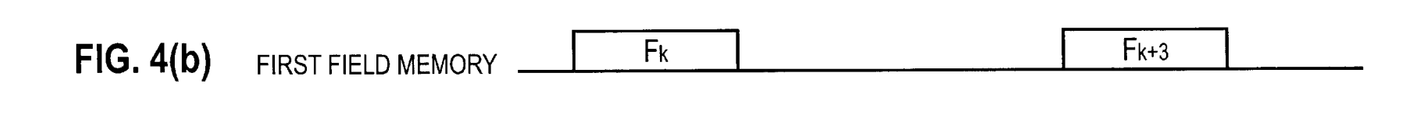
Figure 4C:
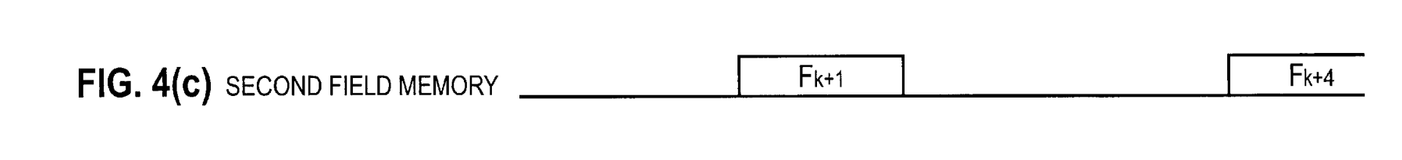
Figure 4D:
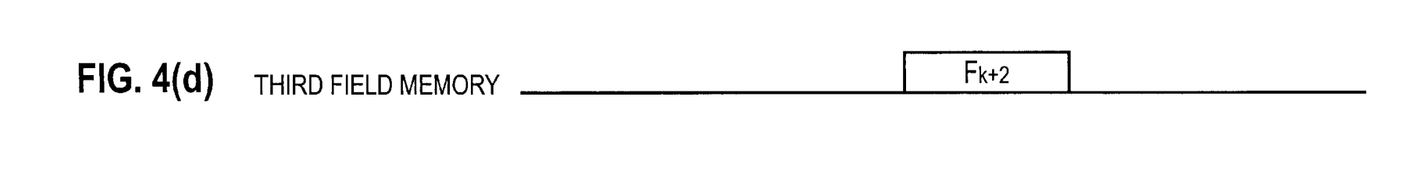
Figure 4E:
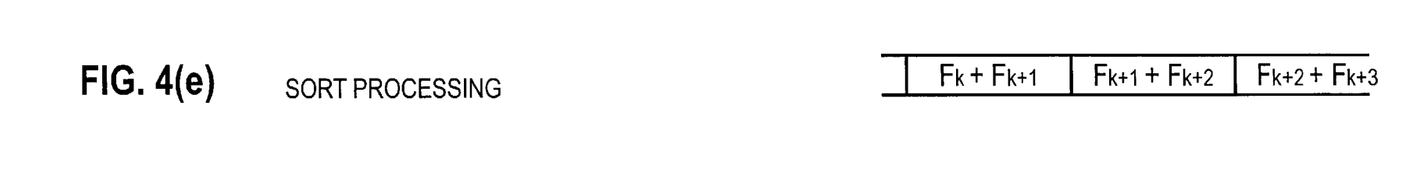

Every time the vertical synchronization signal Vsync is input, the sort processing unit 4 selects two field memories in which the above timer values and the image signals were recently written, and performs sort processing by arranging the image signals in the field memories in an order of timer values corresponding to the image signals and by writing the image signals in the frame memory 5. FIG. 3(c) illustrates the image signals of the progressive scan image subsequent to the sort processing in which the timer values and the image signals are written in the first and second field memories as shown in FIGS. 3(a) and (b), and are sorted by the sort processing unit 4.

The two field memories to be sorted are switched every time the vertical synchronization signal Vsync is input. FIG. 4 is a timing chart illustrating the operation. FIGS. 4(a)–(e) shows the operation of the sort processing unit 4 when the field memory unit 2 includes three field memories. As shown in the drawing, when the image signals corresponding to a certain field Fk are stored in a first field memory and the image signals corresponding to the subsequent field Fk+1 are stored in a second field memory, the sort processing unit 4 sorts the image signals in the fields Fk and Fk+1. While the image signals corresponding to the subsequent field Fk+2 are being stored in a third field memory, the sort processing unit 4 performs the sort processing of the image signals in the first and second field memories, which correspond to the fields Fk and Fk+1, respectively. When the image signals corresponding to the field Fk+2 are stored in the third field memory, the sort processing unit 4 subsequently performs the sort processing of the image signals in the second and third field memories, which correspond to the fields Fk+1 and Fk+2, respectively, while the image signals corresponding to a field Fk+3 are being stored in the first field memory. The subsequent sort processing corresponding to each field is the same as the above processing. Every time the vertical synchronization signal Vsync is input, the sort processing unit 4 selects two field memories in which the image signals were recently written and performs the sort processing of these image signals.

Figure 5:
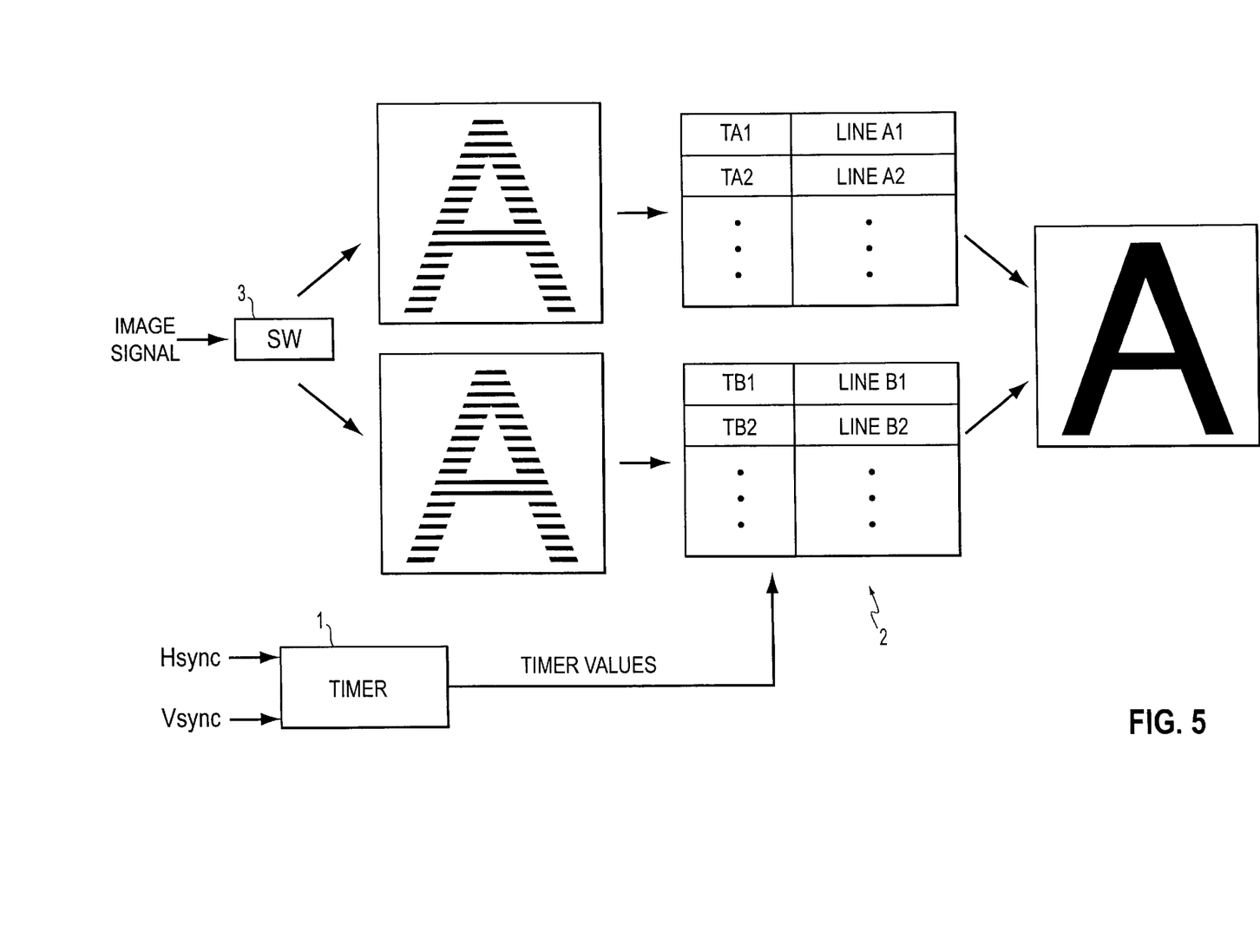
FIG. 5 is an illustration of an overall image of the operation in the above embodiment.

FIG. 5 summarizes and illustrates the operation of the above-described embodiment. According to the above embodiment, one field memory is selected for each field. In each field, every time the horizontal synchronization signal Hsync is input, the timer value which is the elapsed time from the input of the vertical synchronization signal Vsync to the input of the horizontal synchronization signal Hsync is output from the timer 1, and the timer value and the image signal subsequent to the horizontal synchronization signal Hsync are stored in the field memory. In each field, the sort processing is performed for two field memories in which the image signals and the timer values were recently written, thus arranging the image signals in an order of the timer values corresponding to the stored image signals. The sorted image signals of the progressive scan image are stored in the frame memory 5.

Figure 6A:
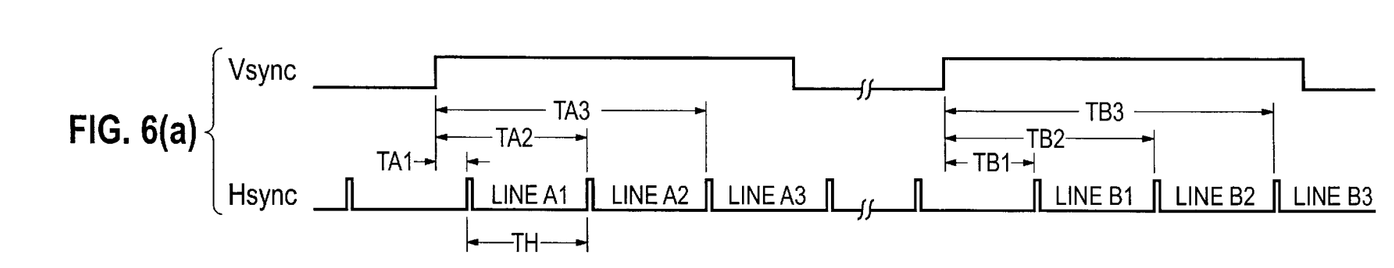
FIGS. 6(a)–(c) include timing charts illustrating an advantage of the above embodiment.
Figure 6B:
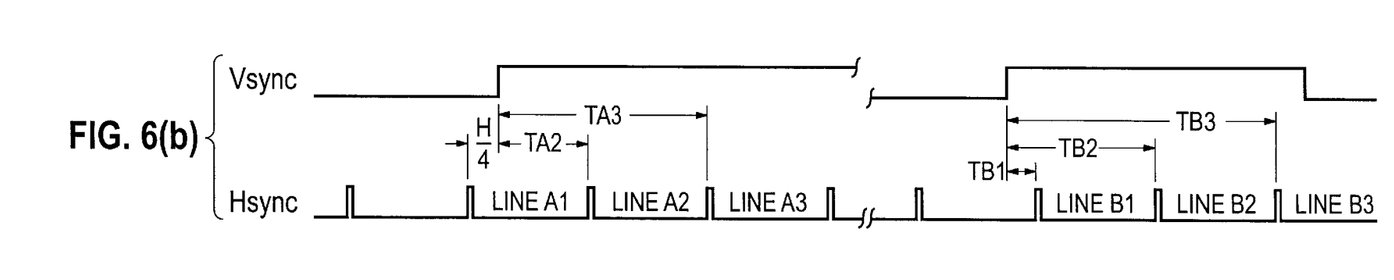
Figure 6C:
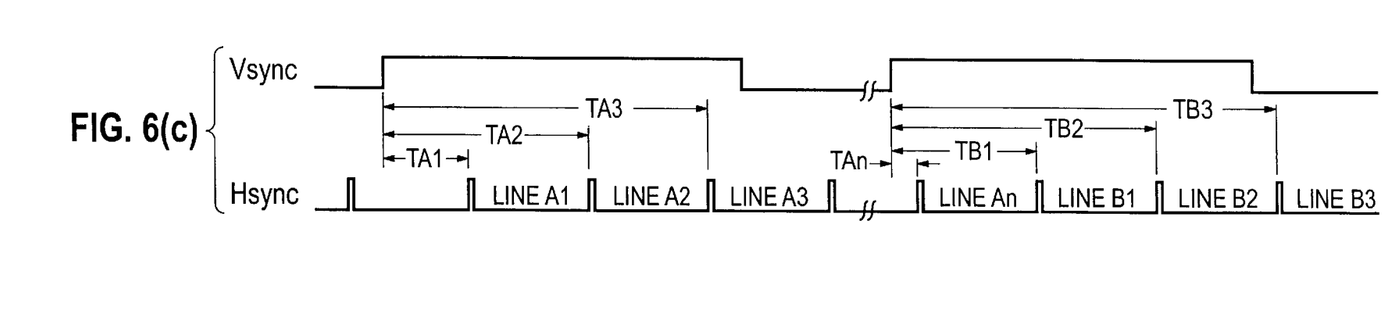

The phase difference between the vertical synchronization signal Vsync and the horizontal synchronization signal Hsync may vary while the image signals are transmitted from, for example, a personal computer to the image signal processor 100. FIGS. 6(*a*) to (*c*) illustrate received waveforms of the vertical synchronization signal Vsync and the horizontal synchronization signal Hsync received by the image signal processor 100 when the image signals of the horizontal scanning lines Line A1, Line B1, Line A2, Line B2, . . . constructing a single screen are transmitted in the interlace transmission system from the personal computer. Images of these horizontal scanning lines shown in these drawings should be displayed in the order of Line A1, Line B1, Line A2, Line B2 . . . on a display screen. In these drawings, the period of each horizontal synchronization signal Hsync is expressed by TH. Since the image signals are transmitted in the interlace system in these examples, a difference between the elapsed time (for example, TAk) from the rising of the vertical synchronization signal Vsync in a certain field to the k-th horizontal synchronization signal Hsync subsequent thereto and the elapsed time (for example, TBk) from the rising of the vertical synchronization signal Vsync in the subsequent field to the k-th horizontal synchronization signal Hsync subsequent thereto is TH/2. This is because the number of horizontal scanning lines in a single frame is odd in the interlace system.

In the examples shown in FIGS. 6(*a*) to (*c*), the phase differences between the vertical synchronization signal Vsync and the horizontal synchronization signal Hsync received by the image signal processor 100 are different from each other. According to the present embodiment, it is possible to normally form the image signals of the progressive scan image even under these circumstances.

In the example shown in FIG. 6(*a*), the vertical synchronization signal Vsync and the horizontal synchronization signal Hsync are transmitted to the image signal processor 100 while the phase difference at the time the signals are transmitted from the personal computer is maintained.

In this example, when the timer values of the horizontal synchronization signal Hsync in two successive fields shown in the drawing are compared, they are in the following relation:

$TA1<TB1<TA2<TB2<\ldots$

Thus, the image signals of the normal progressive scan image are stored in the field memory 5 in FIG. 1 in the following order:

Line A1, Line B1, Line A2, Line B2, . . .

In the next example shown in FIG. 6(*b*), the vertical synchronization signal Vsync and the horizontal synchronization signal Hsync having the same phase difference as that in FIG. 6(*a*) are transmitted from the personal computer. The case in FIG. 6(*b*) has a greater transmission delay of the vertical synchronization signal Vsync than that in the case in FIG. 6(*a*). Hence, the vertical synchronization signal Vsync arrives at the image signal processor 100 at a time H/4 behind the horizontal synchronization signal Hsync of the horizontal scanning line Line A1 which is the first line of the screen. However, the next vertical synchronization signal Vsync subsequent to this vertical synchronization signal Vsync arrives at the image signal processor 100 prior to the horizontal synchronization signal Hsync of the horizontal scanning line Line B1, which is the second line of the screen.

In this case, when the timer values corresponding to the horizontal synchronization signal Hsync in two successive fields are compared, they are in the following relation:

$TB1<TA2<TB2<TA3<\ldots$

Hence, the image signals are stored in the frame memory 5 shown in FIG. 1 in the following order, which corresponds to the display order:

Line B1, Line A2, Line B2, Line A3, . . .

In comparison with the case in FIG. 6(*a*), the case in FIG. 6(*b*) is such that the image signals in the frame memory 5 lack the image signal of the first horizontal scanning line Line A1. This does not cause any problem since this is within a blanking period.

In the next example shown in FIG. 6(*c*), the vertical synchronization signal Vsync and the horizontal synchronization signal Hsync with the same phase difference as that in FIG. 6(*a*) are transmitted from the personal computer. In the case in FIG. 6(*c*), the horizontal synchronization signal Hsync is transmitted with a greater transmission delay than that in FIG. 6(*a*). Therefore, in FIG. 6(*c*), the horizontal synchronization signal Hsync that should have arrived before the second vertical synchronization signal Vsync arrives H/4 later than the second vertical synchronization signal Vsync, and the image signal of the horizontal synchronization line Line An arrives subsequently thereto.

In this case, when the timer values corresponding to the horizontal synchronization signal Hsync in two successive fields are compared, they are in the following relation:

$TAn<TA1<TB1<TA2<TB2<TA3<\ldots$

Hence, the image signals are stored in the frame memory 5 shown in FIG. 1 in the following order, which corresponds to the display order:

Line An, Line A1, Line B1, Line A2, . . .

In comparison with the case in FIG. 6(a), the case in FIG. 6(c) is such that the image signal of the horizontal scanning line Line An corresponding to the bottom portion of the screen is stored in the head of the frame memory 5. This does not cause any problem since this is within a blanking period.

Accordingly, the image signals corresponding to the horizontal scanning lines are arranged in an order of delay time of the horizontal synchronization signal Hsync, which is a starting point of each horizontal scanning line. The delay time is from the vertical synchronization signal Vsync. The arranged image signals are stored in the frame memory 5. Therefore, the image signals corresponding to the horizontal scanning lines are stored in the frame memory 5 in an order corresponding to the positions of the horizontal scanning lines in the vertical direction of the screen. It is thus possible to form the image signals of the normal progressive scan image, even when the phase difference between the received vertical synchronization signal Vsync and the horizontal synchronization signal Hsync is not constant.

Although the above-described image signal processor 100 handles image signals in the interlace system, it may be modified so as to handle image signals not only in the interlace system but also in the progressive scan system by modifying the function of the sort processing unit 4.

Specifically, when performing the sort processing, the sort processing unit 4 determines whether the phase relations between the vertical synchronization signal Vsync and the horizontal synchronization signal Hsync in two successive fields are similar to each other by comparing the timer values in the two fields to be sorted. If the determination is "yes", the sort processing unit 4 determines that the input image signals are of the progressive scan system. The sort processing unit 4 reads the image signals in the most recent field from the corresponding field memory, and writes the image signals in the frame memory 5. In contrast, when the phase relations between the vertical synchronization signal Vsync and the horizontal synchronization signal Hsync in two successive fields are apparently different from each other, the sort processing unit 4 determines that the input image signals are of the interlace system, and performs the sort processing. In this manner, it is possible to perform normal image display of the image signals in both the interlace system and the progressive scan system.

(Embodiment 2)

In the first embodiment, the image signals corresponding to the horizontal scanning periods in two successive fields are sorted while the timer values corresponding to the image signals are employed as the key. In order to continuously display images in each field, the sort processing must be completed within a period of a single field. When the period of a single field is short, it is difficult to complete the sort processing. In view of these circumstances, obtaining the image signals of the progressive scan image by a small processing amount is made possible by the present embodiment.

Figure 7:
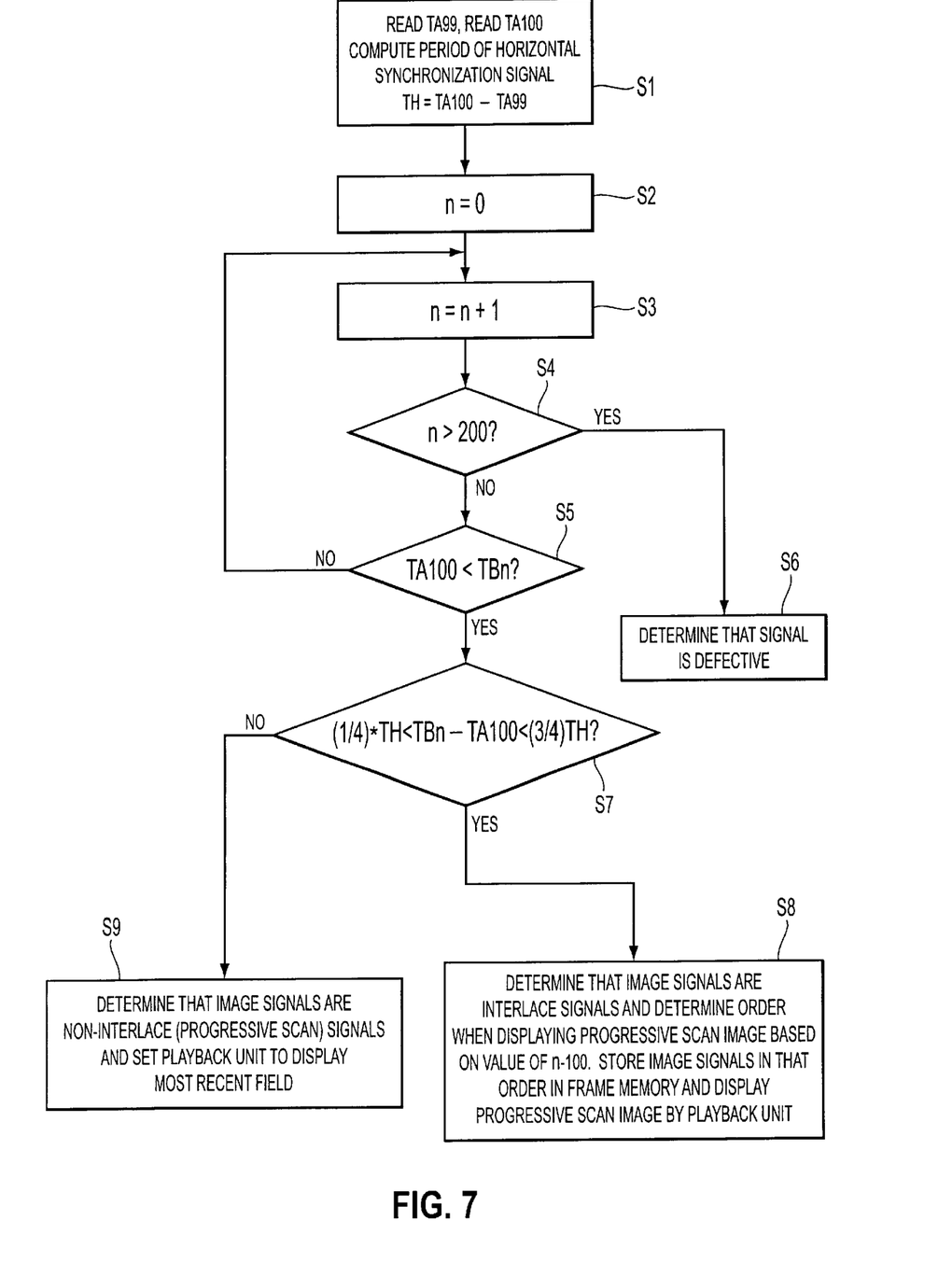
FIG. 7 is a flowchart showing the operation of an image signal processor according to a second embodiment of the present invention.

This embodiment replaces the sort processing unit 4 in the first embodiment with a processor, and the processor performs processing shown in FIG. 7.

When the vertical synchronization signal Vsync is input, the processor selects two field memories in which the image signals and the timer values were recently written. The processor reads the timer value TA99 corresponding to the 99th horizontal scanning signal and the timer value TA100 corresponding to the 100th horizontal scanning signal in one field memory, and computes the period of the horizontal synchronization signal, TH=TA100−TA99 (step S1).

This embodiment performs the following steps to detect the timer value that is the same as or substantially greater than the timer value of the 100th horizontal synchronization signal Hsync from the timer values in the other field memory, and determines whether the horizontal synchronization signal Hsync subsequent to the vertical synchronization signal Vsync, corresponding to this timer value, precedes or follows the 100th horizontal synchronization signal Hsync, thus determining the order of images in each field memory. The 100th horizontal synchronization signal Hsync instead of the horizontal synchronization signal Hsync near the vertical synchronization signal Vsync is employed for comparison because accurate determination can be performed based on the horizontal synchronization signal Hsync near a horizontal synchronization signal Hsync having a stable waveform.

After completing step S1, the processor initializes a control index n to "0" (step S2) and increases n (step S3). While n is equal to or less than 200 (step S4), the processor reads a timer value TBn corresponding to the n-th horizontal synchronization signal Hsync in the other field memory and determines whether TA100<TBn (step S5). If the determination in step S5 is not "yes" and if n>200, it means that a time from the vertical synchronization signal Vsync to the horizontal synchronization signal Hsync in one field is substantially different from that in the other field. Hence, it is determined that a waveform of the vertical synchronization signal Vsync or the horizontal synchronization signal Hsync is defective (step S6).

In contrast, when TA100<TBn prior to n>200, it is determined whether the following condition concerning the timer value TBn is satisfied (step S7):

$$(\tfrac{1}{4})TH < TBn - TA100 < (\tfrac{3}{4})TH$$

If the image signals stored in the field memories are of the interlace system, TBn−TA100 is approximately TH/2. In this case, the determination in step S7 is "yes". The processor thus determines the order of image signals in two field memories based on the value of n−100. The processor stores the image signals in that order in the frame memory 5, and supplies the image signals to the playback unit 200 (step S8).

Specifically, the image signals corresponding to the timer values are stored in the frame memory 5 in the order of timer values, (omission) . . . , TA100, TBn, TA101, TBn+1, . . . (omission), and are supplied to the playback unit 200.

If the determination in step S7 is "no", the processor determines that the image signals in the field memories are of the progressive scan system. The processor selects field memories in the order image signals written, and supplies the image signals in the field memories through the frame memory 5 to the playback unit 200 (step S9).

As described above, according to the present invention, it is possible to form image signals of a progressive scan image by arranging the image signals in each field in a normal order, even when the image signals in an interlace system are input, while a phase difference between a vertical synchronization signal and a horizontal synchronization signal is not constant.

What is claimed is:

1. An image signal processing method comprising:
   associatively storing elapsed times from an input of a vertical synchronization signal to an input of horizontal synchronization signals and image signals in a storage device subsequent to respective horizontal synchronization signals; and
   forming image signals of a progressive scan image by arranging the image signals stored in said storage device within two successive vertical scanning periods in an order of said elapsed times respectively corresponding to the image signals.

2. The image signal processing method according of claim 1, when a difference between said elapsed times within said two successive vertical scanning periods being within a predetermined range, and the input image signals corresponding to horizontal scanning lines being output in an order as the image signals are input.

3. An image signal processing method comprising:

associatively storing in a storage device elapsed times from an input of a vertical synchronization signal to an input of horizontal synchronization signals and image signals subsequent to the respective horizontal synchronization signals; and forming image signals of a progressive scan image by determining, based on said elapsed times stored in said storage device within two successive vertical scanning periods, an order of reading the image signals within the respective vertical scanning periods from said storage device and by alternately reading the image signals corresponding to horizontal scanning lines within the vertical scanning periods according to said order.

4. The image signal processing method according of claim 3, when a difference between said elapsed times within said two successive vertical scanning periods being within a predetermined range, and the input image signals corresponding to horizontal scanning lines being output in an order as the image signals are input.

5. An image signal processor comprising:

a timer that times an elapsed time subsequent to an input of a vertical synchronization signal;

a storage device that associatively stores an image signal input in synchronism with a horizontal synchronization signal and a timer value of said timer at the time said horizontal synchronization signal being input; and a progressive scan image forming device that retrieves a timer value corresponding to a predetermined timer value written in said storage device within one vertical scanning period of two successive vertical scanning periods from timer values written in said storage device within another vertical scanning period, for determining a display order of image signals within the vertical scanning periods by comparing ranking, from the vertical synchronization signal, of horizontal synchronization signals corresponding to the two timer values, that alternately reads the image signals corresponding to horizontal scanning lines within the vertical scanning periods from said storage device in accordance with the display order, and that writes the image signals in a frame memory.

6. An image signal processor comprising:

a timer that times an elapsed time subsequent to an input of a vertical synchronization signal;

a storage device that associatively stores an image signal input in synchronism with a horizontal synchronization signal and a timer value of said timer at a time said horizontal synchronization signal is input;

a frame memory that stores image signals of a single frame; and a progressive scan image forming device that arranges the image signals written in said storage device within two successive vertical scanning periods in accordance with timer values corresponding to the image signals and for writing the image signals in said frame memory.

* * * * *